US 11,056,876 B2

(12) United States Patent
Gerstlacher et al.

(10) Patent No.: US 11,056,876 B2
(45) Date of Patent: Jul. 6, 2021

(54) CIRCUIT ARRANGEMENT FOR SWITCHING INVERTER DEVICES

(71) Applicant: Fronius International GmbH, Pettenbach (AT)

(72) Inventors: Florian Gerstlacher, Pettenbach (AT); Franz Fischereder, Pettenbach (AT); Stefan Breuer, Pettenbach (AT); Thomas Grabner, Pettenbach (AT)

(73) Assignee: FRONIUS INTERNATIONAL GMBH, Pettenbach (AT)

( * ) Notice: Subject to any disclaimer, the term of this patent is extended or adjusted under 35 U.S.C. 154(b) by 0 days.

(21) Appl. No.: 16/650,178

(22) PCT Filed: Sep. 28, 2018

(86) PCT No.: PCT/EP2018/076475
§ 371 (c)(1),
(2) Date: Mar. 24, 2020

(87) PCT Pub. No.: WO2019/063793
PCT Pub. Date: Apr. 4, 2019

(65) Prior Publication Data
US 2020/0227909 A1     Jul. 16, 2020

(30) Foreign Application Priority Data
Sep. 29, 2017   (EP) .................................... 17194138

(51) Int. Cl.
*H02H 7/12*     (2006.01)
*H02J 3/38*     (2006.01)
(Continued)

(52) U.S. Cl.
CPC .......... *H02H 7/1206* (2013.01); *H02J 3/381* (2013.01); *H02M 7/44* (2013.01); *H02S 40/32* (2014.12); *H02J 2300/24* (2020.01)

(58) Field of Classification Search
CPC ........ H02H 7/1206; H02H 7/12; H02S 40/32; H02J 3/381; H02J 3/38; H02J 2300/24; H02M 7/44
See application file for complete search history.

(56) References Cited

U.S. PATENT DOCUMENTS

2015/0001945 A1   1/2015  Estes
2016/0036235 A1   2/2016  Getsla
2017/0271875 A1   9/2017  Narla

FOREIGN PATENT DOCUMENTS

EP      1 209 789 A2    5/2002

OTHER PUBLICATIONS

International Search Report corresponding to international application No. PCT/EP2018/076475 dated Jan. 2, 2019, (13 pages).

*Primary Examiner* — Robert L Deberadinis
(74) *Attorney, Agent, or Firm* — Maginot, Moore & Beck, LLP

(57) ABSTRACT

Circuit arrangement 1 for securely switching inverter devices 2 of a system by a common emergency switch 3 which is connected to a switching signal input 4 of one of the inverter devices 2 which is configured as a master of the system and comprises a switching signal output 5, other inverter devices 2 of the system configured as a slave being connected to the one inverter device via switching signal lines 6, wherein the inverter devices 2 configured as a slave together with the inverter device 2 configured as a master form a switching chain which is automatically switched upon actuation of the emergency switch 3.

15 Claims, 2 Drawing Sheets

(51) Int. Cl.
*H02S 40/32* (2014.01)
*H02M 7/44* (2006.01)

CIRCUIT ARRANGEMENT FOR SWITCHING INVERTER DEVICES

This application is a 35 U.S.C. 371 National Stage application of PCT/EP2018/076475, filed Sep. 28, 2018, and claims priority to European Application No. EP 17194138.8 filed on Sep. 29, 2017. The entire contents of the above-mentioned patent applications are incorporated herein by reference as part of the disclosure of this U.S. application.

The invention relates to a circuit arrangement for securely switching inverter devices of a system, in particular a photovoltaic system. A technical system can comprises a plurality of inverter devices connected in series or in parallel. In many applications, it is necessary to turn off these inverter devices with a single common emergency switch. In conventional systems, the inverters can be connected to such an emergency switch in series or in parallel. However, this can result in wiring errors. Furthermore, there is the possibility that one inverter device of the system fails or is defective.

It is thus an object of the present invention to provide a circuit arrangement for securely switching inverter devices of a system which allows the inverter devices of the system to be securely switched using a single common emergency switch.

In accordance with the invention, this object is achieved by a circuit arrangement having the features described in claim 1.

According to a first aspect, the invention provides a circuit arrangement for securely switching inverter devices of a system by a common emergency switch which is connected to a switching signal input of one of the inverter devices which is configured as a master of the system by means of a configuration switch provided on the inverter device and comprises a switching signal output, other inverter devices of the system configured as a slave by means of configuration switches being connected downstream of the one inverter device in a chain-like manner via switching signal lines, wherein the inverter devices configured as a slave together with the inverter device configured as a master form a switching chain which is automatically switched via the switching signal lines upon actuation of the emergency switch.

In one possible embodiment of the circuit arrangement in accordance with the invention, the inverter devices of the switching chain each comprise four-pole connection terminals which each comprise a two-pole switching signal input and a two-pole switching signal output.

In one possible embodiment of the circuit arrangement in accordance with the invention, the two-pole switching signal input and the two-pole switching signal output of the connection terminal of the inverter device are separated from each other in terms of potential by a potential-separating circuit to avoid compensating currents between the inverter devices of the switching chain.

In one further possible embodiment of the circuit arrangement in accordance with the invention, the two-pole switching signal input and the two-pole switching signal output of the connection terminal of the inverter device are separated from each other in terms of potential by a potential-separating circuit formed as an optoelectronic coupler circuit.

In one further possible embodiment of the circuit arrangement in accordance with the invention, a defective or failed inverter device within the switching chain is automatically bridged by means of a bridging circuit contained in the inverter device.

In one further possible embodiment of the circuit arrangement in accordance with the invention, the bridging circuit of the inverter device is provided between the switching signal input and the switching signal output of the connection terminal of the inverter device.

In one further possible embodiment of the circuit arrangement in accordance with the invention, the bridging circuit of the inverter device comprises at least one diode connected in the flow direction for each switching signal line.

In one further possible embodiment of the circuit arrangement in accordance with the invention, one of the inverter devices of the system is configured as a master of a switching chain by means of the configuration switch provided on the inverter device.

In one further possible embodiment of the circuit arrangement in accordance with the invention, the inverter devices of the switching chain are deactivated or activated in a step-wise and cascade-like manner via switching signal lines starting from the inverter device configured as a master.

In one further possible embodiment of the circuit arrangement in accordance with the invention, the emergency switch is a passive switch which is connected to a switching signal input of the inverter device of the system configured as a master.

In one further possible embodiment of the circuit arrangement in accordance with the invention, each inverter device of the switching chain comprises a direct current input for connecting solar panels which generate a direct current when irradiated with sunlight, which direct current is converted into an alternating current by a current converter circuit provided in the inverter device.

In one further possible embodiment of the circuit arrangement in accordance with the invention, upon activation of one inverter device of the switching chain an AC relay provided in the inverter device is closed in order to output the alternating current generated by the current converter circuit provided in the inverter device to a power network.

In one further possible embodiment of the circuit arrangement in accordance with the invention, the circuit arrangement exclusively comprises hardware components.

In one further possible embodiment of the circuit arrangement in accordance with the invention, the circuit arrangement is formed to be fail-safe.

In one further possible embodiment of the circuit arrangement in accordance with the invention, in the event of a cabling error the relevant inverter device is automatically switched to a safe operating state.

According to a further, second, aspect, the invention further comprises a photovoltaic system having the features stated in claim 14.

Accordingly, the invention provides a photovoltaic system having photovoltaic strings which are each connected to an associated inverter device, wherein the inverter devices of the photovoltaic system can be securely switched by means of a circuit arrangement according to the first aspect of the invention by actuating a common emergency switch.

According to a further, third, aspect, the invention further provides an inverter device for a system having the features stated in claim 15.

Accordingly, the invention provides an inverter device for a system, in particular for a photovoltaic system, wherein the inverter device comprises a switching signal input for connecting an emergency switch of the system or for connecting a switching signal output of another inverter device of the system, and a switching signal output for connecting a switching signal input of another inverter device of the system, wherein the inverter device, upon connection of an emergency switch to its switching signal input, can be configured as a master of a switching chain of the system by means of a configuration switch provided on the inverter device, which chain comprises the inverter device itself configured as a master and all of the inverter devices connected downstream thereof in a chain-like manner at the switching signal output thereof via switching signal lines and configured as a slave by means of configuration switches, wherein the entire switching chain, upon actuation of the emergency switch connected to the switching signal input of the inverter device configured as a master, is automatically switched in a cascade-like manner via the switching signal lines.

Possible embodiments of the various aspects of the invention will be explained hereinafter with reference to the enclosed figures.

Figure 1:
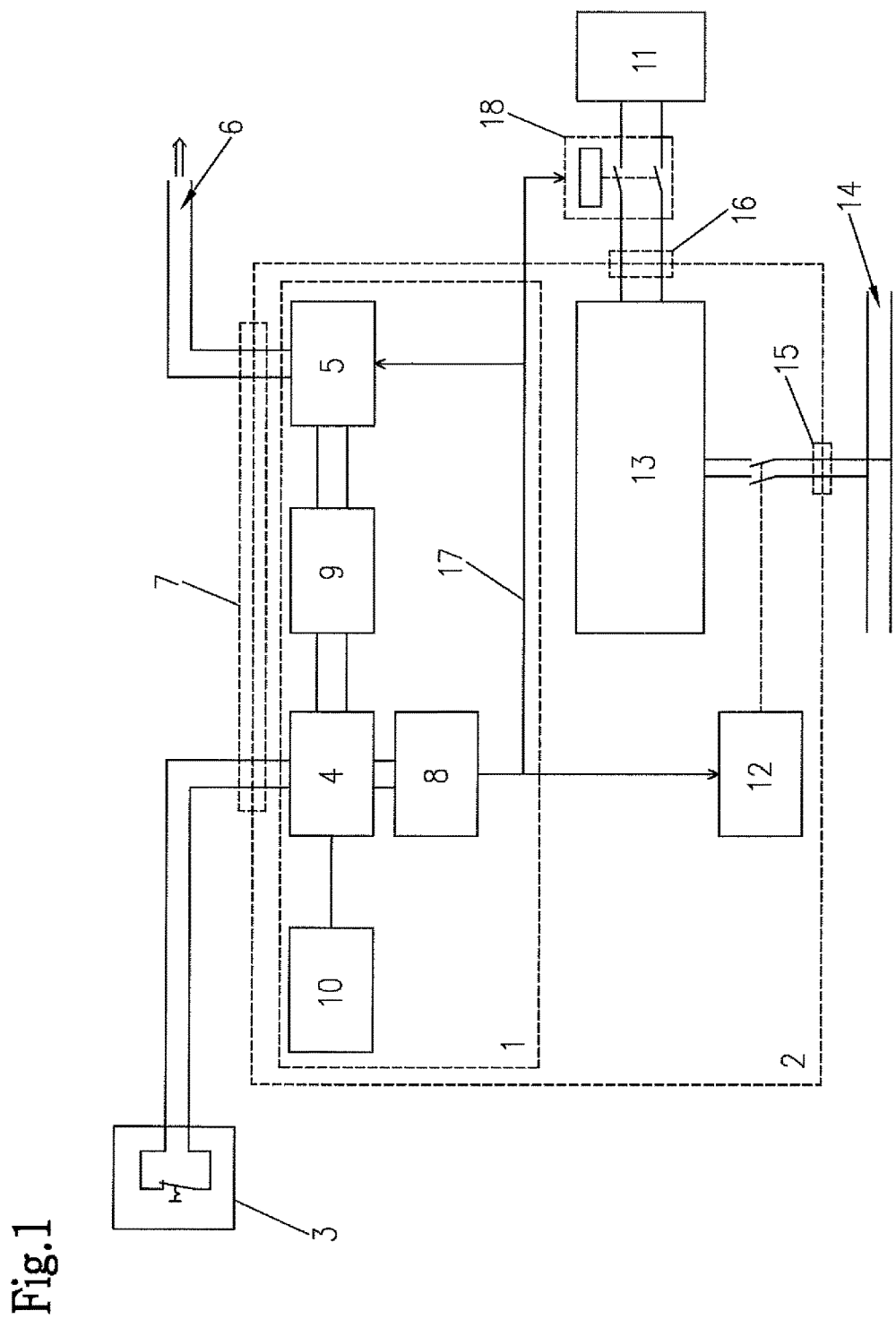
FIG. 1 shows a block diagram of a possible embodiment of a circuit arrangement according to a first aspect of the present invention.

As can be seen in FIG. 1, a circuit arrangement 1 in accordance with the invention according to the first aspect of the present invention can be provided in an inverter device 2 of a system. In the exemplified embodiment illustrated in FIG. 1, a circuit arrangement 1 which is used for securely switching inverter devices of a system by a common emergency switch 3 is integrated in each case in the inverter devices 2 to be switched. In a preferred embodiment, the different inverter devices 2 of a system, in particular a photovoltaic system, each have an associated circuit arrangement 1, as shown in FIG. 1, wherein the circuit arrangement 1 is integrated preferably in the inverter device 2. In an alternative embodiment, the circuit arrangement 1 of the inverter device 2 can also form a separate circuit connected to the inverter device 2. The system, e.g. a photovoltaic system, can comprise a plurality of inverter devices 2 interconnected in a switching chain.

Figure 2:
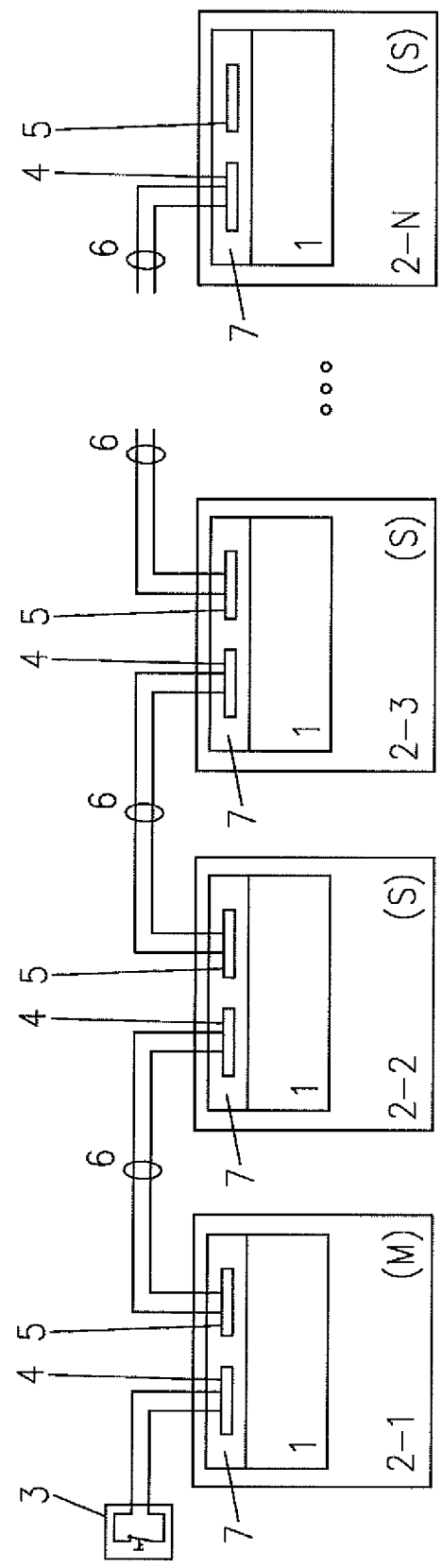
FIG. 2 shows a block diagram to illustrate an exemplified embodiment of a photovoltaic system according to a further aspect of the invention.

FIG. 2 shows an exemplified embodiment in which a switching chain SK consists of a plurality of inverter devices 2 of the system. The different inverter devices 2 form a switching group or switching chain SK which can be switched off in a fail-safe manner by means of a single common emergency switch or emergency stop switch 3.

The circuit arrangement 1 of an inverter device 2 has a switching signal input 4 and a switching signal output 5 as illustrated in the block diagram in FIG. 1. The different inverter devices 2 can each be configured as a master device M or as a slave device S. One inverter device 2 of the switching chain SK is configured as a master M of the relevant switching chain of the system. An emergency switch 3 for the entire switching chain SK is connected to the switching signal input 4 of the particular inverter device 2 which is configured as a master M of the switching chain SK or system. In the block diagram illustrated in FIG. 1, the inverter device 2 can be configured as a master M of the switching chain SK and the emergency switch 3 is connected to the switching signal input 4 of this inverter device 2. The switching signal output 5 of the inverter device 2 which is configured as a master M of the system is connected to another inverter device 2, configured as a slave S, of the system via switching signal lines 6. In the block diagram illustrated in FIG. 1, which illustrates an inverter device 2, configured as a master M, of the switching chain, the switching signal output 5 is connected to a switching signal input 4 (not shown) of an inverter device 2, connected downstream, via two switching signal lines 6, said downstream inverter device being configured as a slave or slave device (S). This slave inverter device 2 has for its part a switching signal output which is connected to the next inverter device 2, likewise configured as a slave S, of the switching chain SK via switching signal lines 6. A switching chain having a predetermined number N of inverter devices 2 accordingly comprises preferably a single inverter device 2 configured as a master M, as illustrated e.g. in FIG. 1, and N–1 inverter devices 2 configured as a slave S. The N–1 inverter devices 2 configured as a slave S form, together with the inverter device 2 configured as a master M, a switching chain SK of the system. The entire switching chain SK, upon actuation of the emergency switch 3 which is connected to the switching signal input 4 of the first inverter device 2-1 configured as a master M, is automatically switched off or powered off.

In one possible embodiment, the different inverter devices 2 of the switching chain SK each have four-pole connection terminals 7, as shown in the block diagram of FIG. 1. The four-pole connection terminal 7 comprises in each case a two-pole switching signal input 4 and a two-pole switching signal output 5.

In order to avoid compensating currents between the different inverter devices 2 of the switching chain SK, the two-pole switching signal input 4 and the two-pole switching signal output 5 of the connection terminal 7 of the inverter device 2 are preferably separated from each other in terms of potential. In the embodiment illustrated in FIG. 1, the circuit arrangement 1 contains a corresponding potential-separating circuit 8.

In one possible embodiment of the circuit arrangement 1 in accordance with the invention, the two-pole switching signal input 4 and the two-pole switching signal output 5 of the connection terminal 7 of the inverter device 2 are separated from each other in terms of potential by an optoelectronic coupler circuit as a potential-separating circuit. The potential-separating circuit 8 has, in one possible embodiment, for each of the two switching signal lines 6 of the switching signal input 4, an optoelectronic coupler which comprises a light-emitting diode and an associated phototransistor. The inverter device 2 is configured as a master device M or as a slave device S preferably by means of a configuration switch 10 provided on the inverter 2. In one possible embodiment, the configuration switch 10 is formed by a DIP switch. In a preferred embodiment, the configuration switch 10 is a hardware switching component which can preferably be actuated manually in order to configure or reconfigure the relevant inverter device 2 as a master device M or as a slave device S.

The inverter devices 2 of a switching chain SK are deactivated in a cascade-like or step-wise manner starting from the inverter device 2-1 configured as a master M, after the emergency switch 2 provided on the inverter device 2 configured as a master M has been actuated by a user or person. The emergency switch 3 is preferably a passive switch which is connected to the switching signal input 4 of the inverter device 2-1, configured as a master M, of the system. In the exemplified embodiment illustrated in FIG. 1, a passive emergency switch 3 is connected to the switching signal input 4 of the inverter device 2. This inverter device 2 is configured as a master M of the switching chain SK using its configuration switch 10. As soon as a user actuates the emergency switch 3, initially the inverter device 2 configured as a master M is switched off or deactivated. Then, the remaining inverter devices 2 of the switching chain SK which are connected downstream and have each been configured as slave devices S by the associated configuration switches 10 are switched off in a step-wise manner via the switching signal lines 6.

In this embodiment, all of the inverter devices 2 of a switching chain SK can thus be automatically deactivated in a cascade-like or step-wise manner in a short period of time with the aid of the emergency switch 3. In this embodiment, the emergency switch 3 forms an emergency stop switch, e.g. for stopping the circuit of a photovoltaic system in an emergency.

In an alternative embodiment, the emergency switch 3 can also be used to activate inverter devices of a system in a step-wise manner. In this alternative embodiment, the emergency switch 3 forms an emergency start switch of the relevant system.

In the embodiment of the inverter device 2 illustrated in FIG. 1, a bridging circuit 9 is provided between the switching signal input 4 and the switching signal output 5 of the circuit arrangement 1. A defective or failed inverter device 2 within the switching chain SK is preferably automatically bridged by means of the bridging circuit 9 contained in the inverter device 2. In one possible embodiment, the bridging circuit 9 of the inverter device 2 comprises at least one diode connected in the flow direction for each switching signal line 6. A diode connected in the flow direction is provided for each switching signal line in order to automatically bridge the defective inverter device 2 in the event of an error in the relevant inverter device 2 within the switching chain. Individual defective inverter devices can thus be automatically bridged and do not result in the entire system failing. The bridging circuit 9 thus forms a bypass circuit which, in the event of an inverter device 2 failing, bridges this failed inverter device.

In the exemplified embodiment illustrated in FIG. 1, the inverter device 2 is used within a photovoltaic system. Solar panels 11 are connected to a direct current or DC input 16 of the inverter device 2 via an RSM (rapid shutdown box) switching arrangement 18, as shown in FIG. 1. When the emergency stop switch 3 performs an emergency deactivation, this results in a separation of the solar panels 11 from the inverter device 2 in that the RSB circuit arrangement 18 is opened. In the exemplified embodiment illustrated in FIG. 1, the output of the potential-separating circuit 8 is connected to the switching signal output 5 and also the RSB switching stage 18 via enable lines 17. In one possible embodiment, the communication to the RSB switching arrangement 18 can also be effected using powerline communication (PLC) on direct current lines. Each inverter device 2 of the switching chain has a direct current input 16 for connection of solar panels 11. These solar panels 11 generated, when irradiated with sunlight, a direct current which is supplied to a current converter circuit 13 of the inverter device 2 via the DC input 16 when the RSB switch 18 is closed. The current converter circuit 13 provided in the inverter device 2 converts the obtained direct current (DC) into an alternating current (AC). When an inverter device 2 of the switching chain SK is activated, an AC relay 12 provided on the inverter device 2 is closed in order to output the alternating current (AC) generated by the current converter circuit 13 to a power network 14 via an AC output 15 of the inverter device 2, as schematically illustrated in FIG. 1. As a result of the emergency stop switch 3 performing an emergency deactivation, the RSB circuit arrangement 18 is separated or opened in order to ensure that no power is fed into the inverter devices 2 of the switching chain SK. Furthermore, the AC relays 12 are opened in order to separate the inverter devices 2 from the power network 14.

In a preferred embodiment, the circuit arrangement 1 exclusively comprises hardware components. Furthermore, the circuit arrangement 1 is preferably formed in a fail-safe manner. Normative specifications can ensure that the failure of an individual component part or individual component in a safety-critical application or safety-critical system does not result in a possibly dangerous malfunction. In a preferred embodiment, the circuit arrangement 1 is accordingly formed in a fail-safe manner, i.e. if an individual component part or individual structural component of the circuit arrangement 1 fails, this does not affect the functional capability of the switching mechanism, in particular the switch-off mechanism. Such individual errors comprise e.g. a short-circuit between two adjacent pins of structural elements or a short-circuit of a pin of a structural element or component part in respect of a supply voltage or earth. Further possible individual errors comprise e.g. defective open connections between component parts or components of the circuit arrangement 1. Faulty behaviour of implemented software or faulty wiring can also be sources of error. In order to exclude faulty behaviour by software as much as possible, the circuit arrangement 1 is thus preferably formed exclusively from hardware components or hardware component parts. The circuit arrangement 1 is rendered fail-safe in a preferred embodiment by the redundant provision of component parts or structural elements. For example, the different component parts or structural elements of the circuit arrangement 1 are each provided twice. Furthermore, by providing suitable distances between the structural elements or component parts or the connection pins thereof, the probability of a short-circuit occurring can be reduced.

In a preferred embodiment of the circuit arrangement 1 in accordance with the invention, the isolated occurrence of an individual error thus does not result in a limitation of the functional capability of the circuit arrangement 1.

In one further possible embodiment of the circuit arrangement 1 in accordance with the invention, in the event of a cabling error the relevant inverter device 2 is automatically switched to a safe operating state.

FIG. 2 shows exemplified embodiments for a switching chain SK which is formed from a plurality of interconnected inverter devices 2. An external emergency switch 3 is connected to the first inverter device 2 of the switching chain SK. This first inverter device 2-1 is configured as a master M of the switching chain SK using its associated configuration switch 10. The number of slave inverter devices 2 connected downstream can vary depending upon the application. By means of actuation of the emergency switch 3, the entire switching chain SK can be switched. In one possible embodiment, as a result of the actuation of the emergency switch 3 all of the inverter devices 2 of the switching chain SK are preferably deactivated successively in a cascade-like manner. For example, inverter devices 2 of a switching chain SK within a photovoltaic system can be deactivated automatically within a short period of time using the emergency switch 3. In an alternative embodiment, inverter devices 2 of the switching chain SK can also be automatically activated or switched on using the emergency switch 3.

As can be seen in FIG. 2, the cabling of the different inverter devices 2-i within the switching chain SK is particularly simple and is preferably effected by means of two switching signal lines 6 between two adjacent inverter devices. The inverter devices 2 are configured or reconfigured by an associated configuration switch 10 provided on each of the inverter devices.

Each inverter device 2 of the switching chain SK has an integrated bridging circuit or bypass circuit 9, and so each inverter device 2 is automatically bridged in the event of a failure. In addition, the different inverter devices are preferably separated from each other in terms of potential by an optoelectronic coupler circuit or potential-separating stage 8 in order to avoid undesired compensating currents between the inverter devices 2 of the switching chain SK. The switching chain SK shown in FIG. 2 is preferably a pure hardware circuit and does not contain any software components. This facilitates the certification of the switching chain SK, in particular a switching chain within a photovoltaic system. By exclusively using hardware components, the functional capability of the system can be easily replicated, whereby possible certification is likewise facilitated.

Further embodiment variants of the circuit arrangement in accordance with the invention are possible.

For example, a user can receive information, by means of an optical display, as to whether the relevant inverter device 2 is configured as a master device M or as a slave device S by means of the associated configuration switch 10. By actuating the configuration switch 10, the corresponding inverter device 2 can then be reconfigured by a user according to the requirements of the system. In one further possible embodiment, the different configuration switches 10 of a switching chain SK can be connected to a logic circuit in order to check whether the different inverter devices 2 within a switching chain SK have been suitably configured. Preferably, the first inverter device 2-1, which is connected to the emergency switch 3, of the switching chain SK is configured as a master M and the remaining inverter devices 2 of the switching chain SK are configured as a slave S. The logic circuit can automatically check whether or not the configuration of the different inverter devices 2 within the switching chain SK has been performed correctly.

In one further possible embodiment, the inverter device 2 has a sensor system for determining whether an emergency switch 3 has been connected or another inverter device 2 is connected upstream to its switching signal input 4. If this sensor system determines that an emergency switch 3 is connected to the switching signal input 4, in one possible embodiment automatic reconfiguration of the inverter device 2 as a master M of a switching chain SK can be performed. Conversely, if the sensor system determines that a switching signal output 5 of an inverter device 2, connected upstream, of the switching chain SK is connected to the switching signal input 4, the relevant inverter device 2 in one possible embodiment is automatically configured as a slave inverter device 2. In this embodiment variant, the configuration or reconfiguration is thus performed automatically or semi-automatically. In one possible embodiment variant, an erroneous configuration of an inverter device 2 is automatically displayed. For example, if the inverter device 2, the switching signal input 4 of which has the emergency switch 3 connected to it, is mistakenly not configured as a master M using its configuration switch 10, this configuration error can be recognised e.g. by means of a logic circuit and then displayed to a user.

In a further embodiment variant, it can be displayed whether the bridging circuit 9 has performed bridging when an error has occurred, i.e. it is displayed whether the relevant inverter device 2 is defective and accordingly should preferably be replaced within the switching chain SK. Upon actuation of the emergency switch 3, all of the devices interconnected in the switching chain SK are successively activated or deactivated preferably in some measure by a domino effect. Switching the different inverter devices 2 within the switching chain SK is preferably effected at a very high switching speed. The use of the bridging circuit 9 or the bypass circuit within the circuit arrangement 1 ensures that the switching domino effect itself continues to the end of the switching chain SK in the event of a failure of a defective device located within the switching chain.

The circuit arrangement 1 is used to securely switch inverter devices 2 for a system having a common emergency switch 3 and thus permits wired shutdown (WSD) of the relevant system. The circuit arrangement 1 in accordance with the invention can be used in one possible embodiment for securely switching off inverter devices 2 of a system having a single common emergency switch 3. In an alternative application, the circuit arrangement 1 can also be used to switch on different inverter devices 2 of a system having a single common switch 3.

In one possible embodiment, the connection terminal 7 is formed by a four-pole X25 connector. For example, pin 1 and pin 2 of the connection terminal X25 form the switching signal input 4 and pin 3 and pin 4 of the connection terminal X25 form the switching signal output 5. If the switching signal input 4 at the connection terminal 7 is activated, the switching signal output 5 is likewise activated. The switching signal output 5 activates the switching signal input 4 of the subsequent inverter device 2 by way of the cabling using the switching signal lines 6. By way of this domino effect, all of the inverter devices 2 interconnected in the switching chain SK can be successively activated. In a first variant, the activation can consist of the relevant inverter device 2 being automatically switched off. Alternatively, the activation can consist of the relevant inverter device 2 being automatically switched on. Enable lines 17 within the inverter device 2 ensure that the internal electronics are activated and the associated AC relay 12 is switched. Furthermore, the switching signal output 5 of the X25 connection terminal 7 is activated via the enable lines 17.

Depending upon the application, further embodiment variants of the circuit arrangement 1 in accordance with the invention are possible. For example, in one possible embodiment, the configuration switches 10 can be replaced by control lines which are connected to a central control circuit of the system. Furthermore, an operating state of the circuit arrangement 1 and/or of the inverter device 2 can be communicated to this central controller of the system. For example, the fact of whether or not an inverter device 2 is defective can be communicated. Owing to the bridging circuit 9, the switching chain SK functions even if a defect occurs within the inverter device 2 or if a defect occurs within the circuit arrangement 1. A defective inverter device 2-i can accordingly be removed from the switching chain SK without acute time pressure, in that the switching signal output 5 of the inverter device 2-(i−1) connected upstream is directly connected to the switching signal input of the inverter device 2-(i+1) connected upstream using switching signal lines 6 and the defective inverter device 2-i is removed. Alternatively, the defective inverter device is replaced by a fault-free inverter device 2-i. The switching chain SK securely connects the different participants or inverter devices 2 to each other and also offers the option of bridging failed or defective devices 2. Any number N of devices or inverter devices 2 can be reliably and rapidly switched on or off depending upon the application using a single emergency switch 3. Relatively long path lengths between different inverter devices 2 can be achieved e.g. by means of a 12 V switching potential and by means of corresponding isolating measures.

LIST OF REFERENCE SIGNS

1 Circuit arrangement
2 Inverter device
3 Emergency switch
4 Switching signal input
5 Switching signal output
6 Switching signal lines
7 Connection terminal
8 Potential-separating circuit
9 Bridging circuit
10 Configuration switch
11 Solar panels
12 AC relay
13 Current converter circuit
14 Power network
15 AC output
16 DC input
17 Internal enable line
18 RSB

The invention claimed is:

1. A circuit arrangement for securely switching a plurality of inverter devices of a system by a common emergency switch which is connected to a switching signal input of a first one of the plurality of inverter devices which is configured as a master of the system by means of a configuration switch provided on the first one of the plurality of inverter device and which comprises a switching signal output, other inverter devices of the plurality of inverter devices configured as a slave by means of configuration switches being connected downstream of the first one of the plurality of inverter devices in a chain-like manner via switching signal lines, wherein the other inverter devices configured as a slave together with the first one of the plurality of inverter devices configured as a master form a switching chain which is automatically switched via the switching signal lines in a cascade-like manner upon actuation of the emergency switch.

2. The circuit arrangement as claimed in claim 1, wherein the plurality of inverter devices of the switching chain each comprise four-pole connection terminals which each comprise a two-pole switching signal input and a two-pole switching signal output.

3. The circuit arrangement as claimed in claim 2, wherein the two-pole switching signal input and the two-pole switching signal output of the connection terminal of each of the plurality of inverter devices are separated from each other in terms of potential by a potential-separating circuit in order to avoid compensating currents between the plurality of inverter devices of the switching chain.

4. The circuit arrangement as claimed in claim 3, wherein the two-pole switching signal input and the two-pole switching signal output of the connection terminal of each of the plurality of inverter devices are separated from each other in terms of potential by a potential-separating circuit formed as an optoelectronic coupler circuit.

5. The circuit arrangement as claimed in claim 1, further comprising a bridging circuit contained within each of the plurality of inverter devices configured to automatically bridge a defective or failed inverter device within the switching chain.

6. The circuit arrangement as claimed in claim 5, wherein the bridging circuit of each of the plurality of inverter devices is provided between the switching signal input and the switching signal output of the connection terminal of the corresponding inverter device.

7. The circuit arrangement as claimed in claim 6, wherein the bridging circuit of each of the plurality of inverter devices comprises at least one diode connected in the flow direction for each switching signal line.

8. The circuit arrangement as claimed in claim 1, wherein the emergency switch is a passive switch which is connected to a switching signal input of the first one of the plurality of inverter devices configured as a master.

9. The circuit arrangement as claimed in claim 1, wherein each of the plurality of inverter devices of the switching chain comprises a direct current input for connecting solar panels which generate a direct current when irradiated with sunlight, which direct current is converted into an alternating current by a current converter circuit provided in each of the plurality of inverter devices,
wherein, upon activation of one of the plurality of inverter devices of the switching chain, an AC relay provided in the activated inverter device is closed in order to output the alternating current, generated by the current converter circuit provided in the activated inverter device, to a power network.

10. The circuit arrangement as claimed in claim 1, wherein the circuit arrangement exclusively comprises hardware components.

11. The circuit arrangement as claimed in claim 1, wherein the circuit arrangement is formed to be fail-safe.

12. The circuit arrangement as claimed in claim 1, wherein, in the event of a cabling error of one of the plurality of inverter devices, the one of the plurality of inverter devices is automatically switched to a safe operating state.

13. The circuit arrangement as claimed in claim 1, wherein the configuration switches of the switching chain are connected to a logic circuit which checks whether any of the plurality of inverter devices within the switching chain are suitably configured.

14. A photovoltaic system having photovoltaic strings which are each connected to an associated inverter device, wherein the inverter devices of the photovoltaic system can be securely switched off by means of a circuit arrangement as claimed in claim 1 by actuating a common emergency switch.

15. An inverter device for a system having an emergency switch and a plurality of such inverter devices, wherein each inverter device comprises:
a switching signal input configured for connecting to either the emergency switch of the system or a switching signal output of another of the plurality of inverter devices of the system;
a switching signal output configured for connecting to a switching signal input of another of the plurality of inverter devices of the system; and
configuration switch configured and operable to configure a first one of the plurality of inverter devices as a master of a switching chain of the system upon connection of the emergency switch to said switching signal input of the first one of the plurality of inverter devices, which chain comprises the inverter device configured as a master and all of the other inverter devices of the plurality of inverter devices connected downstream thereof in a chain-like manner at the switching signal output of each of the plurality of inverter devices via switching signal lines, the configuration switch further configured and operable to configure each of the other inverter devices as a slave, wherein the entire switching chain, upon actuation of the emergency switch connected to the switching signal input of the inverter device configured as a master, is automatically switched in a cascade-like manner via the switching signal lines.

* * * * *